US012564971B2

(12) United States Patent
Saegusa

(10) Patent No.: US 12,564,971 B2
(45) Date of Patent: Mar. 3, 2026

(54) AIR CHUCK HAVING FIRST AND SECOND SOLENOID VALVES

(71) Applicant: SMC CORPORATION, Tokyo (JP)

(72) Inventor: Masahiro Saegusa, Moriya (JP)

(73) Assignee: SMC CORPORATION, Tokyo (JP)

( * ) Notice: Subject to any disclaimer, the term of this patent is extended or adjusted under 35 U.S.C. 154(b) by 1003 days.

(21) Appl. No.: 17/657,982

(22) Filed: Apr. 5, 2022

(65) Prior Publication Data

US 2022/0324120 A1      Oct. 13, 2022

(30) Foreign Application Priority Data

Apr. 13, 2021      (JP) ................................. 2021-067506

(51) Int. Cl.
B25J 15/02          (2006.01)
B25J 15/08          (2006.01)

(52) U.S. Cl.
CPC ......... B25J 15/0253 (2013.01); B25J 15/086 (2013.01)

(58) Field of Classification Search
CPC ....... B25J 15/0253; B25J 15/086; B25J 15/08
USPC .............................................. 294/192, 119.1
See application file for complete search history.

(56) References Cited

U.S. PATENT DOCUMENTS 4,557,660  A      12/1985  Nakashima et al.
4,741,568  A  *  5/1988  Borcea ...................... B25B 1/18
                                                          294/115

4,913,481  A  *  4/1990  Chin ...................... B25J 15/028
                                                          294/207
5,595,413  A  *  1/1997  McGeachy .......... B25J 15/0253
                                                          294/207
5,944,326  A  *  8/1999  Ishibashi .............. B25J 15/0273
                                                          279/119

(Continued)

FOREIGN PATENT DOCUMENTS

DE      10 2017 109 291 A1      11/2017
JP          59-90594 U      6/1984

(Continued)

OTHER PUBLICATIONS

Japan Notice of Reasons for Refusal issued Oct. 29, 2024 in Japanese Patent Application No. 2021-067506 with English translation, 7 pgs.

(Continued)

*Primary Examiner* — Paul T Chin
(74) *Attorney, Agent, or Firm* — Oblon, McClelland, Maier & Neustadt, L.L.P.

(57) ABSTRACT

A chuck unit includes a first pressure chamber and a second pressure chamber disposed on both sides of a piston for driving fingers. A valve unit includes a first output air flow path connected to one of the first and second pressure chambers, a second output air flow path connected to the other thereof, a first solenoid valve connected to the first output air flow path, and a second solenoid valve connected to the second output air flow path. The first solenoid valve connects the first output air flow path to an air supply source when energized and opens the first output air flow path to atmosphere when de-energized, and the second solenoid valve opens the second output air flow path to atmosphere when energized and connects the second output air flow path to the air supply source when de-energized.

6 Claims, 10 Drawing Sheets

(56)     References Cited

U.S. PATENT DOCUMENTS

| | | | | |
|---|---|---|---|---|
| 6,318,779 | B1 * | 11/2001 | Hanne .................. | B25J 15/0273 |
| | | | | 294/207 |
| 6,938,938 | B2 * | 9/2005 | Risle ................... | B25J 15/0253 |
| | | | | 294/207 |
| 11,007,653 | B2 * | 5/2021 | Zimmer ................. | B23Q 7/043 |

FOREIGN PATENT DOCUMENTS

| | | | |
|---|---|---|---|
| JP | 2006-272476 | A | 10/2006 |
| JP | 2010-149224 | A | 7/2010 |

OTHER PUBLICATIONS

Extended European Search Report issued on Aug. 25, 2022 in European Patent Application No. 22167071.4, 9 pages.
European Office Action issued Aug. 6, 2024 in European Patent Application No. 22 167 071.4, 5 pages.

* cited by examiner

AIR CHUCK HAVING FIRST AND SECOND SOLENOID VALVES

CROSS-REFERENCE TO RELATED APPLICATIONS

This application is based upon and claims the benefit of priority from Japanese Patent Application No. 2021-067506 filed on Apr. 13, 2021, the contents of which are incorporated herein by reference.

BACKGROUND OF THE INVENTION

Field of the Invention

The present invention relates to an air chuck attached to a robot arm, a transport device, or the like (hereinafter referred to as "robot arm or the like").

Description of the Related Art

Conventionally, there has been known a technique in which an opening/closing chuck for gripping a workpiece is attached to a tip side of an arm of a robot. For example, JP 2010-149224 A discloses a robot hand including a hand main body portion attached to an arm of a robot, and a hand tip portion detachably attached to the hand main body portion. A chuck for gripping a workpiece by driving of an air cylinder is attached to the hand tip portion.

The hand main body portion of the robot hand includes a plurality of solenoid valves necessary for driving the chuck, a flow path for supplying air to an input port of each solenoid valve, and a flow path for supplying air from an output port of each solenoid valve to the hand tip portion. As a result, the hand main body portion can be adapted to various hand tip portions, and there is no need to arrange external tubes for air supply around the robot hand.

SUMMARY OF THE INVENTION

In an opening/closing chuck driven by air using two solenoid valves, it is necessary to prevent a workpiece from falling when the solenoid valves are de-energized due to a power failure or the like. In this case, it should be noted that the form of gripping the workpiece by the opening/closing chuck includes a form in which the workpiece is sandwiched and gripped inside a pair of fingers, and a form in which the pair of fingers are moved away from each other and the workpiece is gripped outside the pair of fingers. In particular, in an opening/closing chuck in which the number of air tubes provided outside is reduced, it is not possible to easily change the solenoid valves or the air tubes, and it is therefore not easy to prevent the workpiece from falling according to the gripping form of the workpiece.

The present invention has the object of solving the aforementioned problem.

An air chuck according to the present invention comprises: a chuck unit including a plurality of fingers; and a valve unit attached to a robot arm or a transport device. The chuck unit includes a first pressure chamber and a second pressure chamber disposed on both sides of a piston configured to drive the plurality of fingers. The valve unit includes a first output air flow path connected to one of the first pressure chamber or the second pressure chamber, a second output air flow path connected to another one of the first pressure chamber or the second pressure chamber, a first solenoid valve connected to the first output air flow path, and a second solenoid valve connected to the second output air flow path. The first solenoid valve connects the first output air flow path to an air supply source when energized and opens the first output air flow path to atmosphere when de-energized. The second solenoid valve opens the second output air flow path to the atmosphere when energized and connects the second output air flow path to the air supply source when de-energized. Preferably, the chuck unit is configured to be selectively connected to the valve unit at a first rotation position or a second rotation position, a rotation angle of the chuck unit around a central axis of the valve unit at the first rotation position being different from the rotation angle of the chuck unit around the central axis of the valve unit at the second rotation position. The first output air flow path is connected to the first pressure chamber and the second output air flow path is connected to the second pressure chamber at the first rotation position. The first output air flow path is connected to the second pressure chamber and the second output air flow path is connected to the first pressure chamber at the second rotation position.

According to the air chuck, it is possible to prevent the workpiece from falling when the solenoid valves are de-energized due to a power failure or the like, and it is possible to easily realize the prevention of falling of the workpiece according to the gripping form of the workpiece.

In the air chuck according to the present invention, since a combination of two solenoid valves, namely, a normally closed solenoid valve and a normally open solenoid valve is adopted, it is possible to prevent the workpiece from falling when the solenoid valves are de-energized due to a power failure or the like. Further, the chuck unit can be selectively connected to the valve unit at the first rotation position or the second rotation position, the rotation angle of the chuck unit around the central axis of the valve unit at the first position being different from that at the second position, and the connection relationship between the two solenoid valves and the two pressure chambers can therefore be switched. For this reason, it is possible to easily realize the prevention of falling of the workpiece according to the gripping form of the workpiece.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
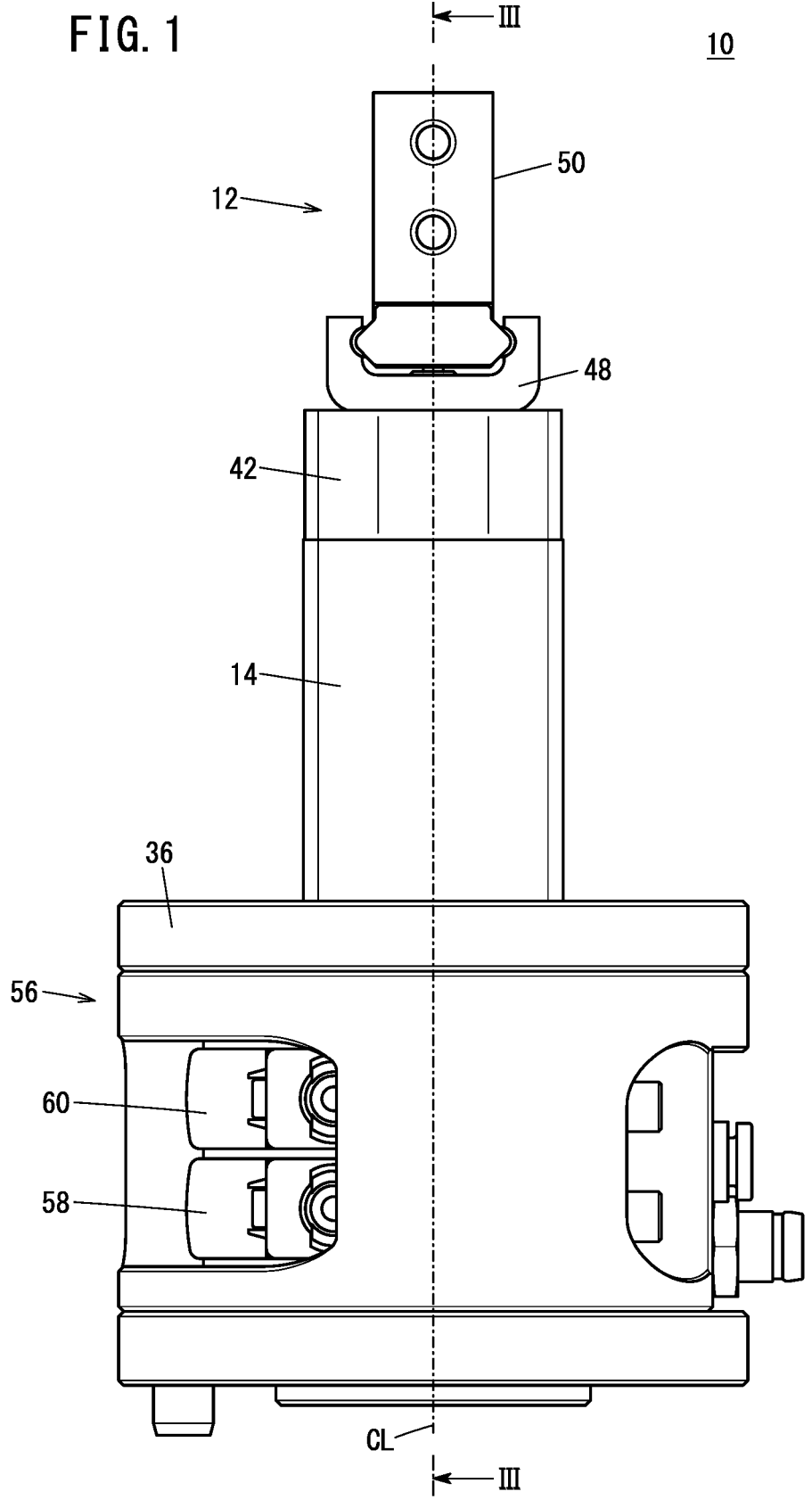
FIG. 1 is a front view of an air chuck according to an embodiment of the present invention.

In the following description, when terms in relation to upper and lower directions are used, for the sake of convenience, such terms refer to the directions shown in the drawings, however, the actual arrangement of the respective constituent members or the like is not limited thereby. An air chuck 10 according to an embodiment of the present invention is formed of a chuck unit 12 and a valve unit 56. (Configuration of Chuck Unit 12)

Figure 2:
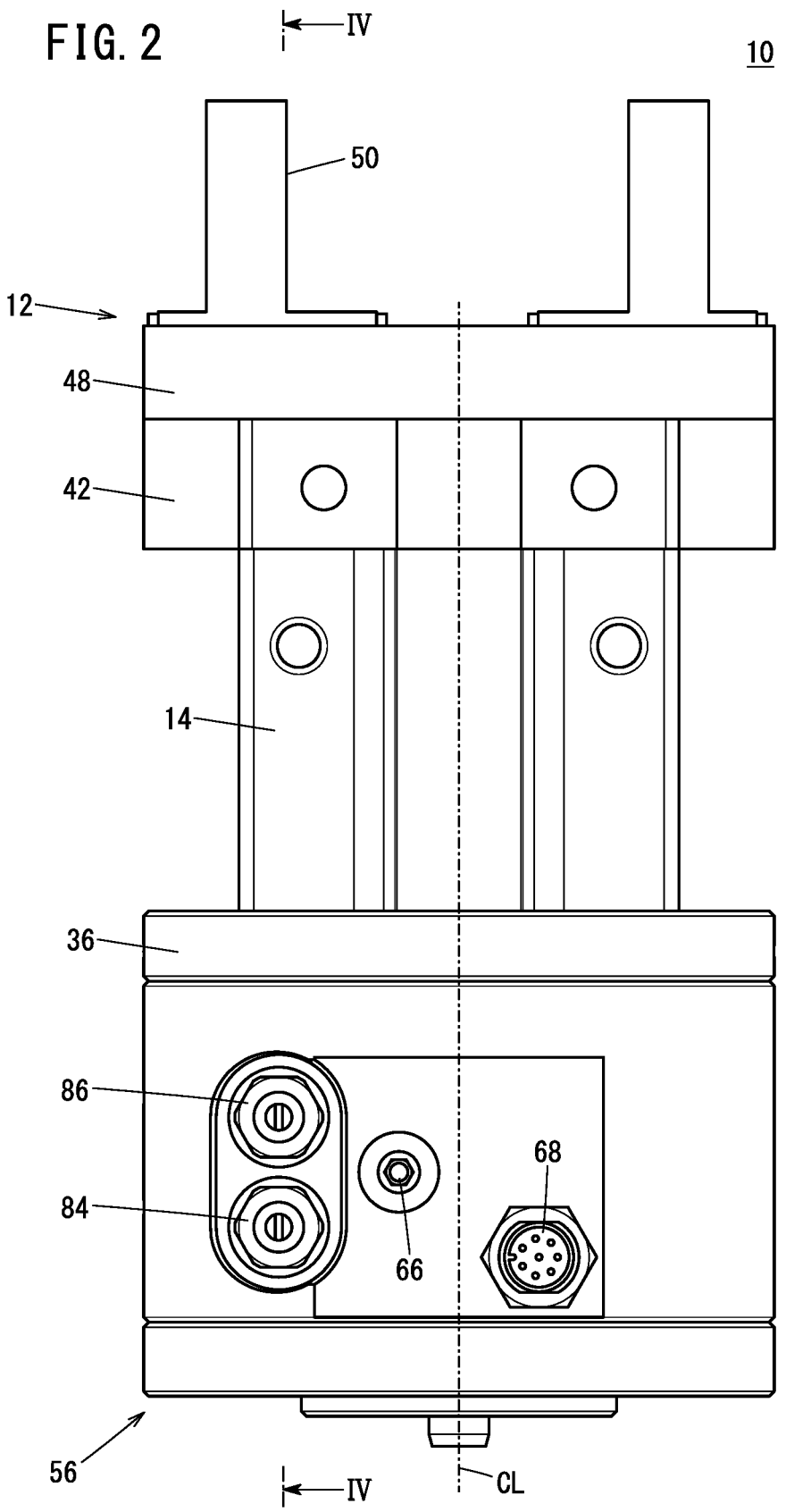
FIG. 2 is a side view of the air chuck of FIG. 1.

As shown in FIGS. 1 and 2, the chuck unit 12 includes a rectangular parallelepiped cylinder body 14, a disk-shaped connector body 36, a base body 42, and a pair of fingers 50 for gripping a workpiece. The connector body 36 is connected to the lower side of the cylinder body 14, and the base body 42 is connected to the upper side of the cylinder body 14.

Figure 3:
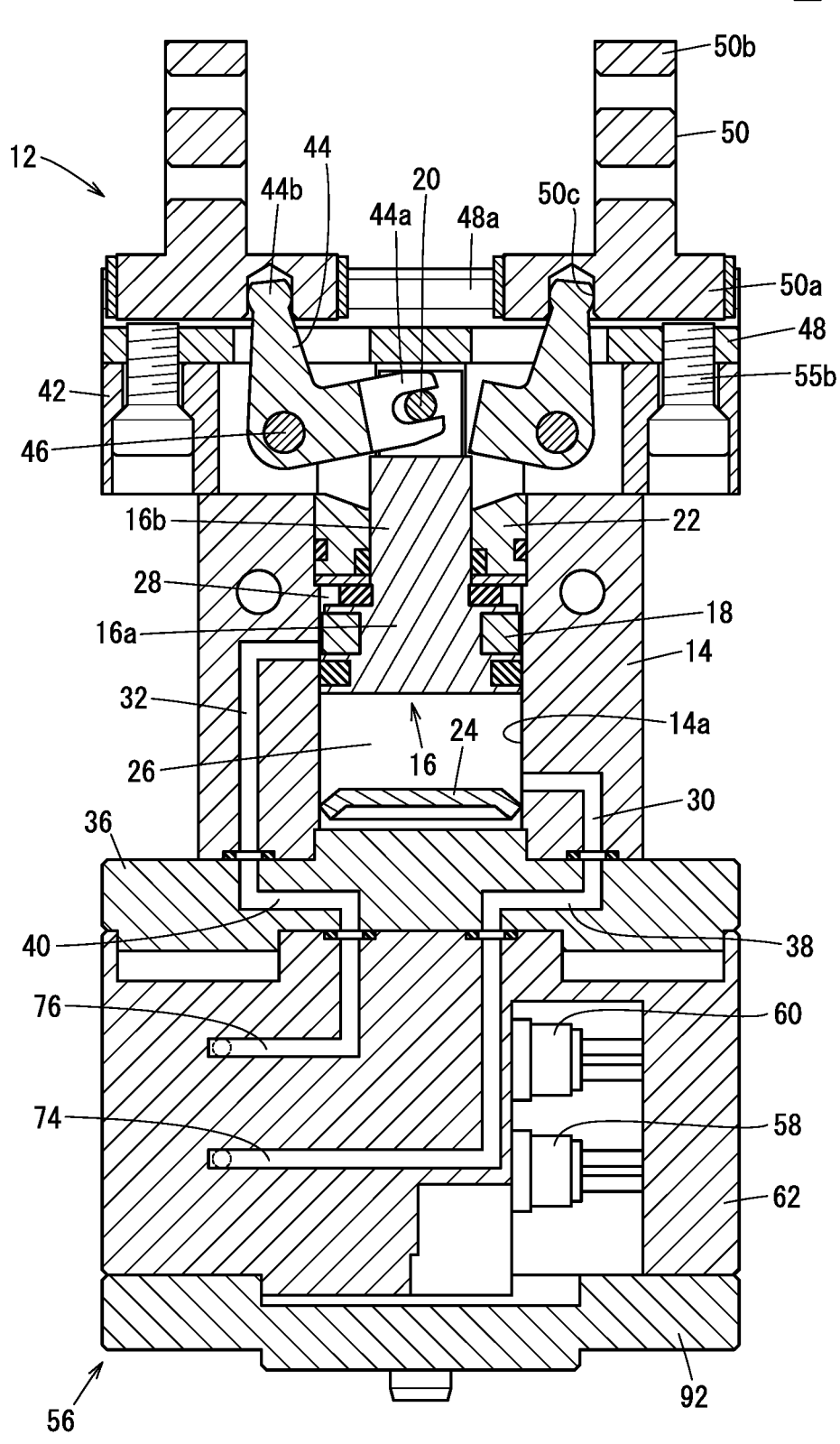
FIG. 3 is a cross-sectional view of the air chuck of FIG. 1 taken along line III-III.

As shown in FIG. 3, the cylinder body 14 has a cylinder hole 14*a* that opens at both ends, and a piston 16 is disposed in the cylinder hole 14*a*. The piston 16 includes a main body portion 16*a* sliding in the cylinder hole 14*a*, and a rod portion 16*b* extending upward from the main body portion 16*a*. A rod cover 22 is attached to an upper end opening portion of the cylinder hole 14*a*, and a cap 24 is attached to a lower end opening portion of the cylinder hole 14*a*.

A first pressure chamber 26 is formed between the main body portion 16*a* of the piston 16 and the cap 24, and a second pressure chamber 28 is formed between the main body portion 16*a* of the piston 16 and the rod cover 22. The cylinder body 14 includes a first pressure chamber air flow path 30 communicating with the first pressure chamber 26, and a second pressure chamber air flow path 32 communicating with the second pressure chamber 28. The first pressure chamber air flow path 30 and the second pressure chamber air flow path 32 open at a lower end of the cylinder body 14.

Figure 5:
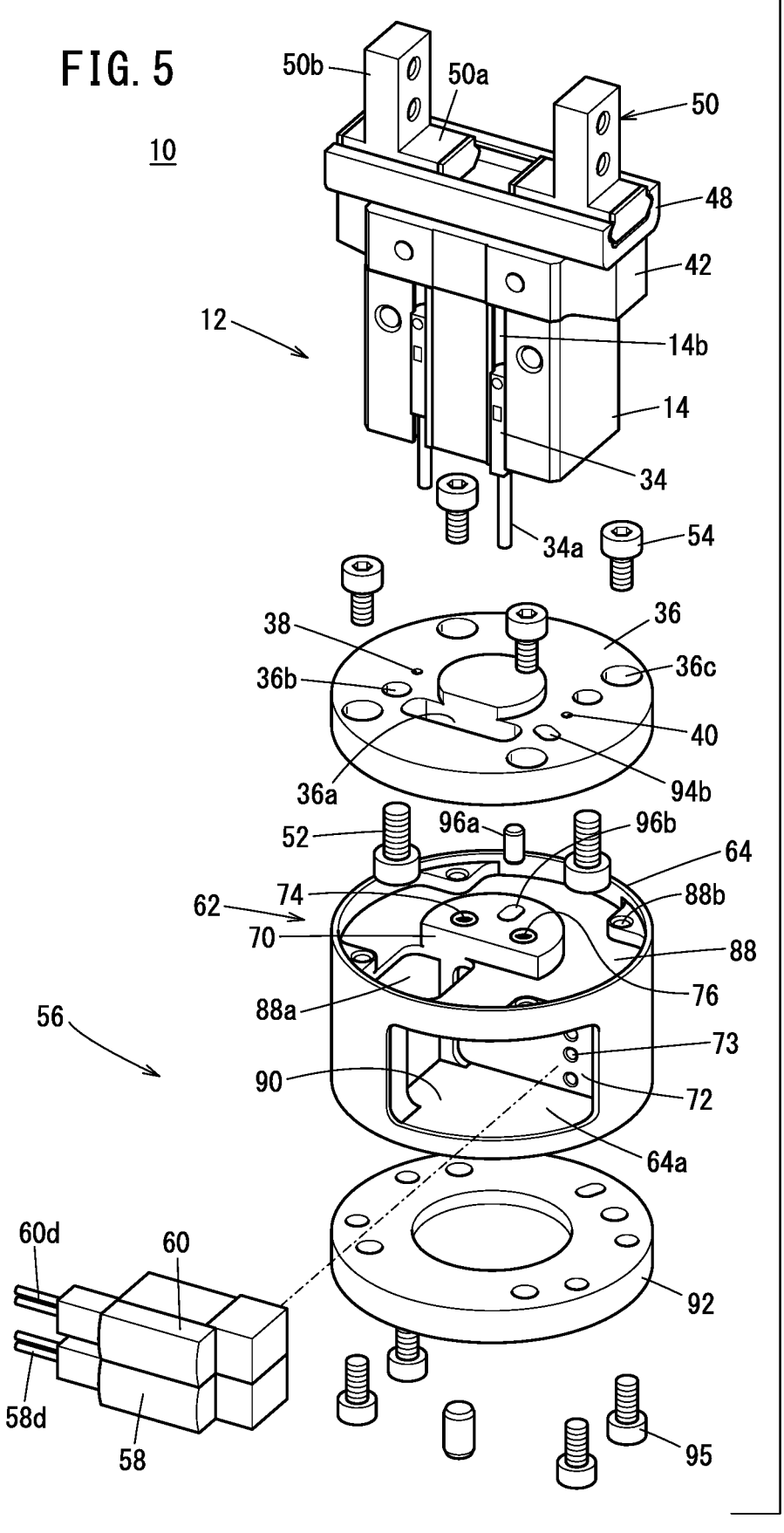
FIG. 5 is a partially developed view of the air chuck of FIG. 1 when viewed from a predetermined direction.

A wide side surface of the cylinder body 14 is provided with two sensor grooves 14*b* extending from an upper end to a lower end of the cylinder body 14 (see FIG. 5). Magnetic sensors 34 for detecting the magnetism of magnets 18 mounted on the piston 16 are attached to the respective sensor grooves 14*b*. The position of the piston 16 can be detected by the magnetic sensors 34. Lead wires 34*a* of the magnetic sensors 34 extend downward from the cylinder body 14.

A pair of L-shaped levers 44 are disposed on the base body 42. Each of the levers 44 has a first end portion 44*a* bifurcated by a cutout groove portion, and a second end portion 44*b* formed in a spherical shape. Each of the levers 44 is rotatably supported at its central portion by a lever shaft 46 fixed to the base body 42. The first end portion 44*a* of the lever 44 engages with an engagement pin 20 attached to the rod portion 16*b* of the piston 16.

A support member 48 that supports the pair of fingers 50 is disposed on the upper side of the base body 42. The support member 48 is provided with a pair of rail grooves 48*a* for guiding the fingers 50 such that the fingers 50 are movable in a direction orthogonal to the axis of the cylinder hole 14*a*. The fingers 50 each have a base portion 50*a* disposed between the pair of rail grooves 48*a* of the support member 48, and a finger portion 50*b* extending upward from the base portion 50*a*. A plurality of rolling elements 49 are arranged between the base portion 50*a* of the finger 50 and the rail grooves 48*a* of the support member 48. The second end portion 44*b* of the lever 44 engages with an engagement groove 50*c* provided in the base portion 50*a* of the finger 50. Reference symbol 55*a* denotes bolts for connecting the base body 42 to the cylinder body 14. Reference symbol 55*b* denotes bolts for connecting the support member 48 to the base body 42.

When air is supplied to the first pressure chamber 26 and air is discharged from the second pressure chamber 28, the piston 16 is driven upward. As a result, the pair of levers 44 rotate in the direction in which the second end portions 44*b* separate from each other, and the pair of fingers 50 move away from each other. When air is supplied to the second pressure chamber 28 and air is discharged from the first pressure chamber 26, the piston 16 is driven downward. As a result, the pair of levers 44 rotate in the direction in which the second end portions 44*b* approach each other, and the pair of fingers 50 move toward each other.

A first connection passage 38 and a second connection passage 40 pass through the connector body 36 in the up-down direction. The first connection passage 38 is connected to the first pressure chamber air flow path 30 of the cylinder body 14, and the second connection passage 40 is connected to the second pressure chamber air flow path 32 of the cylinder body 14. A lead wire insertion hole 36*a* through which the lead wires 34*a* of the magnetic sensors 34 are inserted passes through the connector body 36 in the up-down direction.

Figure 4:
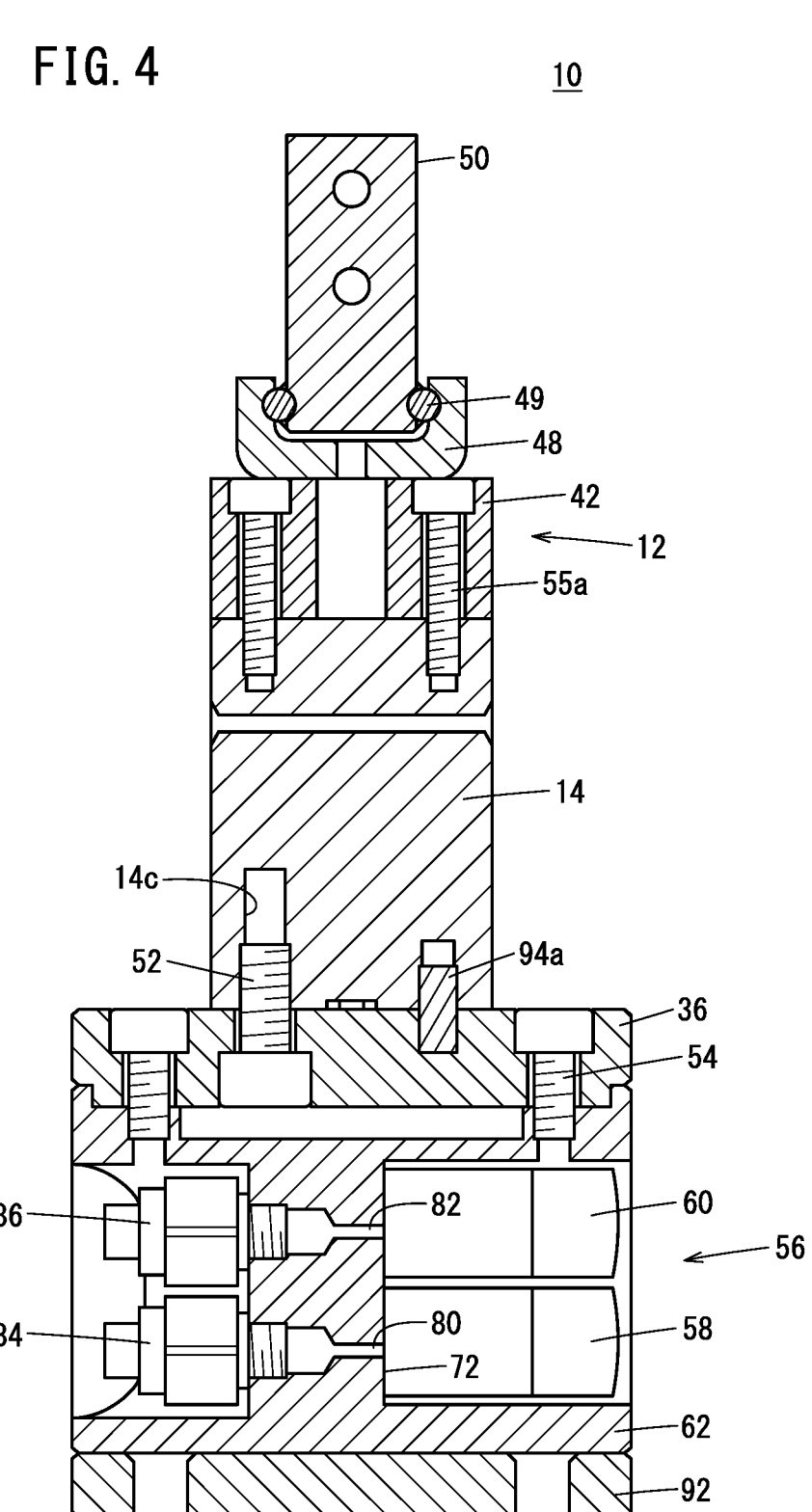
FIG. 4 is a cross-sectional view of the air chuck of FIG. 2 taken along line IV-IV.

A first bolt 52 is inserted through a first bolt insertion hole 36*b* of the connector body 36 and is screwed into a screw hole 14*c* of the bottom portion of the cylinder body 14. As a result, the connector body 36 is connected to the cylinder body (see FIG. 4). Reference symbols 94*a* and 94*b* denote a pin and a pin hole, respectively, used for positioning when the connector body 36 is connected to the cylinder body 14.

As shown in FIG. 5, the connector body 36 includes four second bolt insertion holes 36*c* at positions close to the outer periphery thereof. The second bolt insertion holes 36*c* are arranged at intervals of 90 degrees around a central axis CL of the connector body 36. The second bolt insertion holes 36*c* are not covered by the cylinder body 14 in a state where the connector body 36 is connected to the cylinder body 14. (Configuration of Valve Unit 56)

Figure 6:
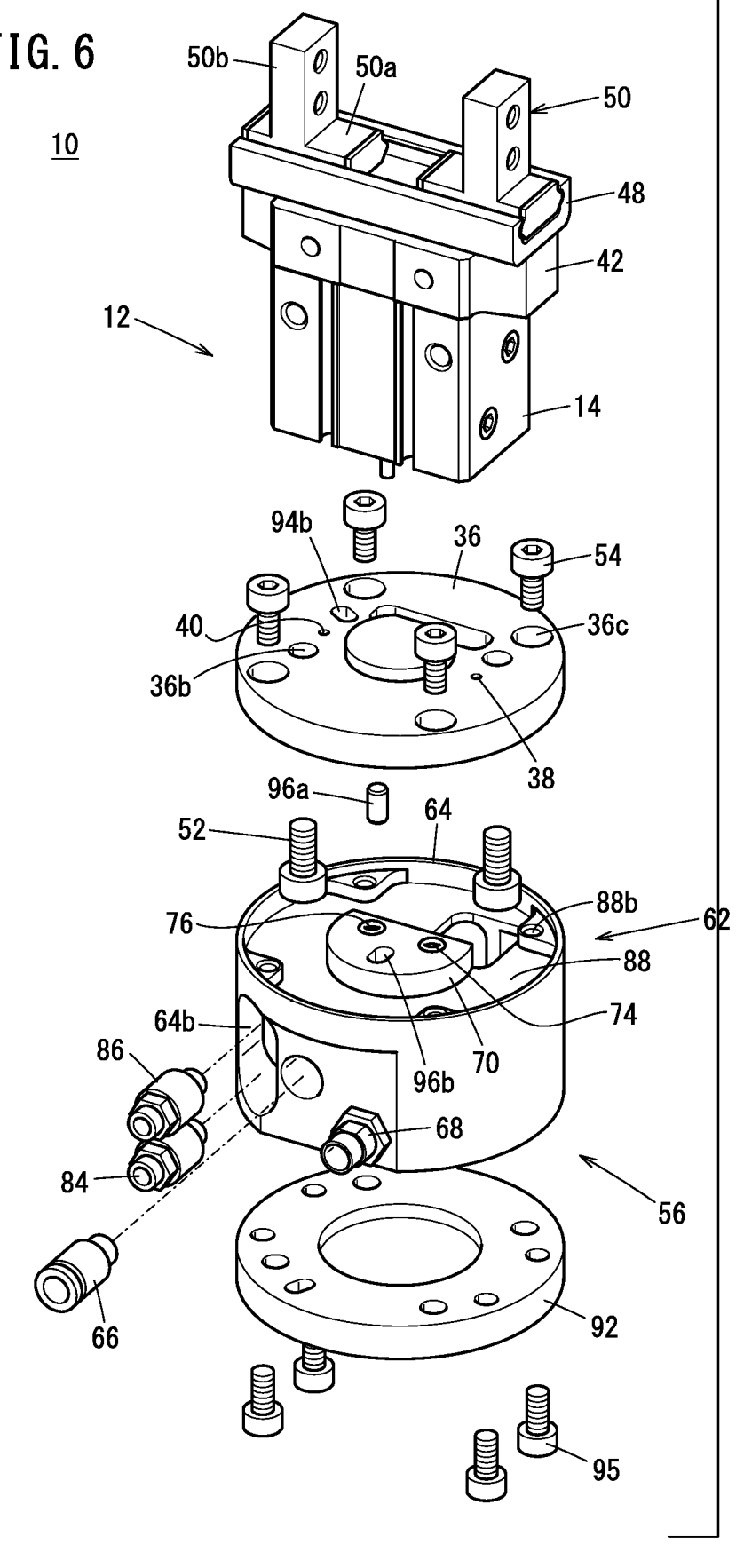
FIG. 6 is a partially developed view of the air chuck of FIG. 1 when viewed from a direction different from that of FIG. 5.

As shown in FIGS. 5 and 6, the valve unit 56 includes a valve unit main body 62 to which a first solenoid valve 58 and a second solenoid valve 60 are attached, and a disk-shaped adapter 92 connected to the lower side of the valve unit main body 62. The valve unit main body 62 includes a cylindrical outer wall portion 64, a flow path block portion 70 inside the outer wall portion 64, an upper plate portion 88, and a lower plate portion 90 on the lower side of the flow path block portion 70. The upper plate portion 88 crosses the flow path block portion 70 inside the outer wall portion 64. The adapter 92 is a member to be attached to the robot arm or the like (not shown).

The outer wall portion 64 has a rectangular first opening 64*a*. The outer wall portion 64 has a second opening 64*b* at a position on an opposite side to the first opening 64*a* with respect to a central axis CL of the valve unit 56 (which is the same as the central axis CL of the connector body 36). The flow path block portion 70 includes a flat solenoid valve joint surface 72 facing the first opening 64*a*. The first solenoid valve 58 and the second solenoid valve 60 are attached to the solenoid valve joint surface 72, and are attachable and detachable through the first opening 64*a*.

The flow path block portion 70 includes a first output air flow path 74 and a second output air flow path 76. One end of the first output air flow path 74 opens to an upper surface of the flow path block portion 70, and the other end thereof opens to the solenoid valve joint surface 72. Similarly, one end of the second output air flow path 76 opens to the upper surface of the flow path block portion 70, and the other end thereof opens to the solenoid valve joint surface 72. In FIG. 5, openings of the first output air flow path 74 and the second output air flow path 76 in the solenoid valve joint surface 72 are omitted. Reference numeral 73 denotes screw holes for attaching the first solenoid valve 58 and the second solenoid valve 60.

As will be described later, one end of the first output air flow path 74 is connected to one of the first connection passage 38 or the second connection passage 40 of the connector body 36. Further, one end of the second output air flow path 76 is connected to the other of the first connection passage 38 and the second connection passage 40 of the connector body 36. FIG. 3 shows a state where the first output air flow path 74 is connected to the first connection passage 38 and the second output air flow path 76 is connected to the second connection passage 40.

Figure 7:
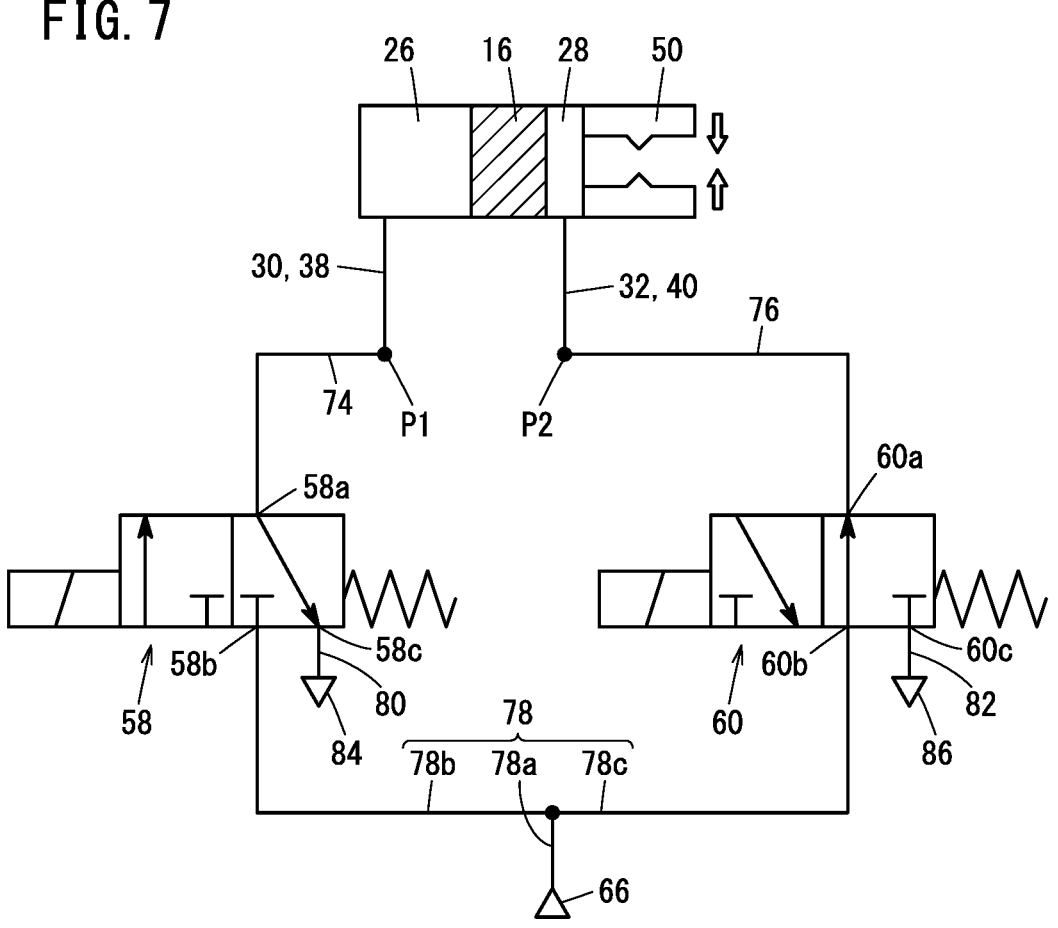
FIG. 7 is a fluid circuit diagram of the air chuck of FIG. 1 when a chuck unit is connected to a valve unit at a first rotation position.

Further, the flow path block portion 70 includes a supply air flow path 78 including a common flow path 78a, a first branch flow path 78b, and a second branch flow path 78c (see FIG. 7). One end of the common flow path 78a opens to a side surface of the flow path block portion 70 located on the opposite side of the solenoid valve joint surface 72. A supply port 66 is attached to the opening (see FIG. 6). The first branch flow path 78b and the second branch flow path 78c branch from the common flow path 78a, and open to the solenoid valve joint surface 72. Air is supplied to the supply port 66 from an air supply source (not shown). In FIG. 5, openings of the first branch flow path 78b and the second branch flow path 78c in the solenoid valve joint surface 72 are omitted.

The flow path block portion 70 further includes a first discharge air flow path 80 and a second discharge air flow path 82. One end of the first discharge air flow path 80 opens to the solenoid valve joint surface 72, and the other end thereof opens to a side surface of the flow path block portion 70 at a position facing the second opening 64b. Similarly, one end of the second discharge air flow path 82 opens to the solenoid valve joint surface 72, and the other end thereof opens to the side surface of the flow path block portion 70 at a position facing the second opening 64b. A first exhaust port 84 provided with a variable throttle valve is connected to the other end of the first discharge air flow path 80, and a second exhaust port 86 provided with a variable throttle valve is connected to the other end of the second discharge air flow path 82 (see FIG. 4). In FIG. 5, openings of the first discharge air flow path 80 and the second discharge air flow path 82 in the solenoid valve joint surface 72 are omitted.

As shown in FIG. 7, the first solenoid valve 58 and the second solenoid valve 60 are configured as two-position three-port switching valves. A first port 58a of the first solenoid valve 58 is connected to the first output air flow path 74. A second port 58b of the first solenoid valve 58 is connected to the first branch flow path 78b of the supply air flow path 78. A third port 58c of the first solenoid valve 58 is connected to the first discharge air flow path 80. A first port 60a of the second solenoid valve 60 is connected to the second output air flow path 76. A second port 60b of the second solenoid valve 60 is connected to the second branch flow path 78c of the supply air flow path 78. A third port 60c of the second solenoid valve 60 is connected to the second discharge air flow path 82.

The first solenoid valve 58 is configured such that the first port 58a is connected to the second port 58b when energized, and the first port 58a is connected to the third port 58c when de-energized. That is, the first solenoid valve 58 is a normally closed solenoid valve that connects the first output air flow path 74 to the air supply source when energized and opens the first output air flow path 74 to the atmosphere when de-energized.

On the other hand, the second solenoid valve 60 is configured such that the first port 60a is connected to the third port 60c when energized, and the first port 60a is connected to the second port 60b when de-energized. That is, the second solenoid valve 60 is a normally open solenoid valve that opens the second output air flow path 76 to the atmosphere when energized, and connects the second output air flow path 76 to the air supply source when de-energized.

The outer wall portion 64 includes an electrical connector 68 at a position proximate to the supply port 66. A lead wire 58d for supplying power to the first solenoid valve 58 and a lead wire 60d for supplying power to the second solenoid valve 60 are connected to the electrical connector 68. Further, the lead wires 34a of the magnetic sensors 34 extending downward from an opening 88a of the upper plate portion 88 are also connected to the electrical connector 68. Reference numeral 95 denotes bolts for connecting the adapter 92 to the valve unit main body 62.

Figure 9:
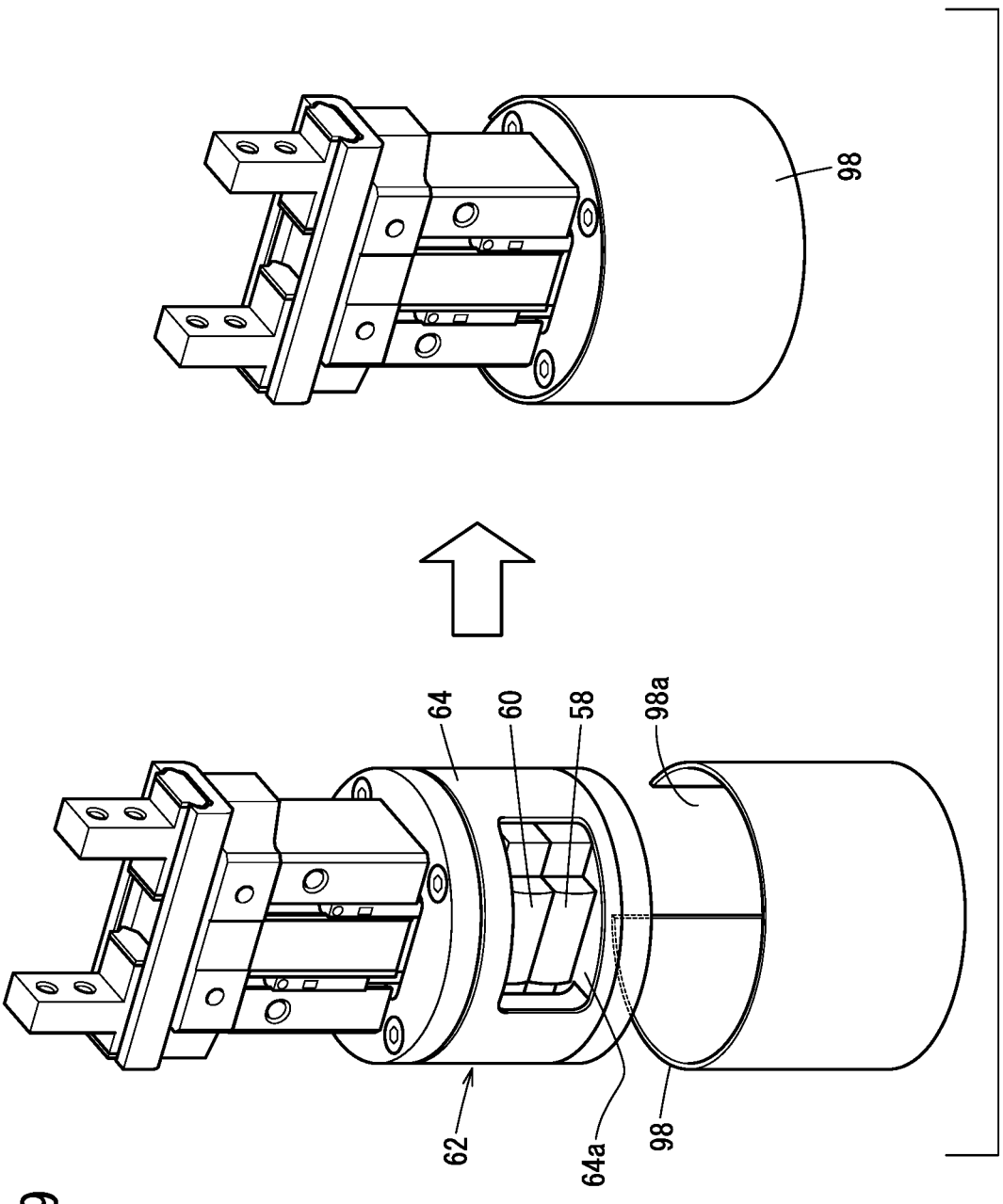
FIG. 9 shows a state in which a waterproof cover is attached to the air chuck of FIG. 1.

As shown in FIG. 9, a cylindrical waterproof cover 98 that covers the first opening 64a is attached to the cylindrical outer wall portion 64 of the valve unit main body 62. The waterproof cover 98 protects the first solenoid valve 58, the second solenoid valve 60, and the like. Note that the waterproof cover 98 includes an opening 98a for not covering the first exhaust port 84 and the second exhaust port 86.

(Configuration of Connection of Chuck Unit 12 and Valve Unit 56)

As shown in FIG. 5, the upper plate portion 88 of the valve unit main body 62 includes four second bolt mounting holes 88b at positions close to the outer wall portion 64. The second bolt mounting holes 88b are arranged at intervals of 90 degrees around the central axis CL of the valve unit 56. The second bolts 54 are inserted into the second bolt insertion holes 36c of the connector body 36 of the chuck unit 12 from the upper side of the connector body 36, and are screwed into the second bolt mounting holes 88b of the upper plate portion 88. Thus, the connector body 36 is connected to the valve unit main body 62. That is, the chuck unit 12 is connected to the valve unit 56 by the four second bolts 54.

Figure 10:
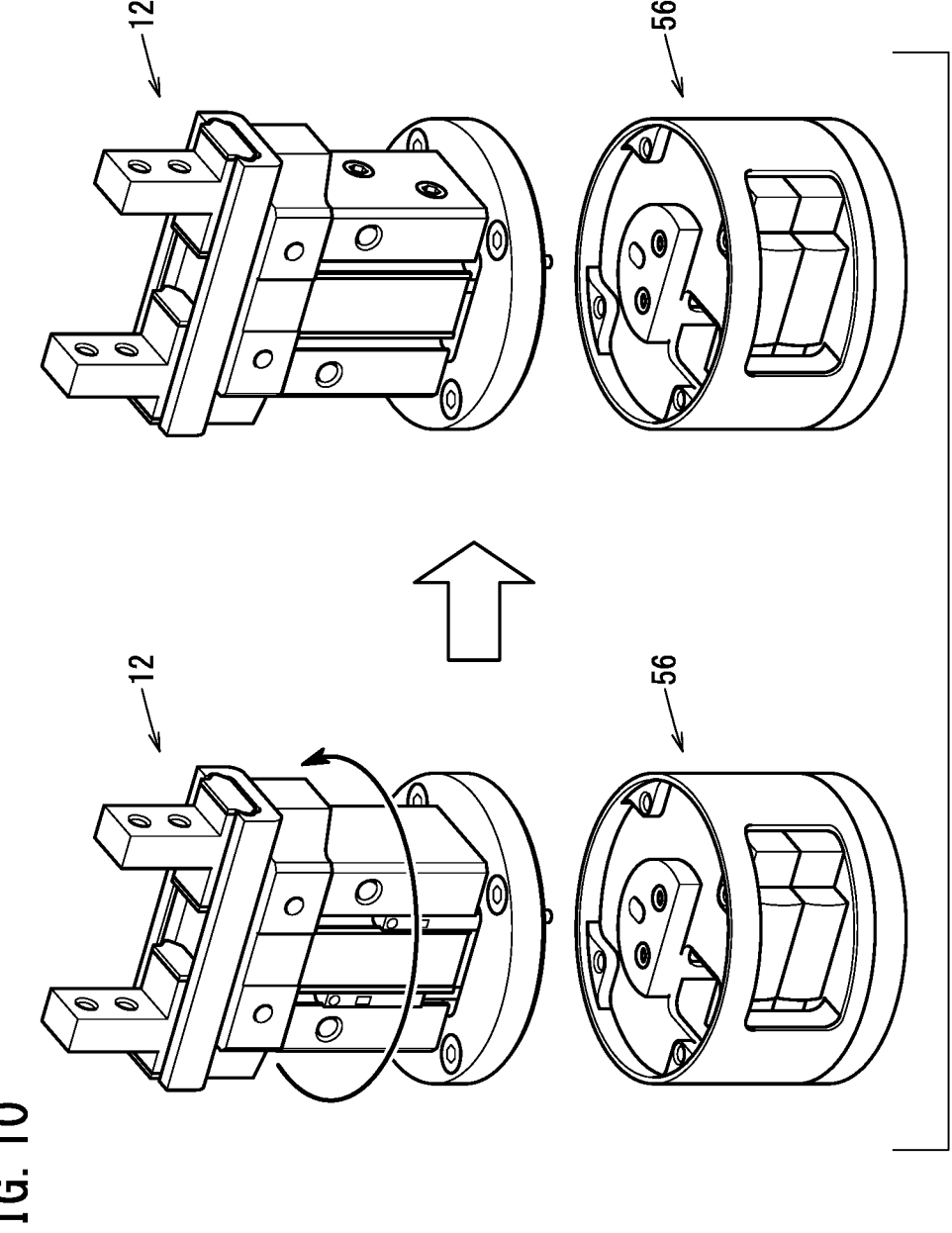
FIG. 10 is a view showing a change of a state in which the chuck unit is connected to the valve unit in the air chuck of FIG. 1.

The chuck unit 12 can be connected to the valve unit 56 at two positions, the rotation angle of the chuck unit 12 around the central axis CL of the valve unit 56 being different at the two positions by 180 degrees (see FIG. 10). Hereinafter, these positions are referred to as a "first rotation position" and a "second rotation position". In the present embodiment, the chuck unit 12 is connected to the valve unit 56 by the four second bolts 54 arranged at intervals of 90 degrees. However, other connecting elements may be used as long as the chuck unit 12 can be connected to the valve unit 56 at positions where the rotation angle of the chuck unit 12 is different by 180 degrees. Reference symbols 96a and 96b denote a pin and a pin hole, respectively, used for positioning when the connector body 36 is connected to the valve unit main body 62.

At the first rotation position, the first output air flow path 74 of the flow path block portion 70 of the valve unit main body 62 is connected to the first connection passage 38 of the connector body 36 of the chuck unit 12. Further, the second output air flow path 76 of the flow path block portion 70 of the valve unit main body 62 is connected to the second connection passage 40 of the connector body 36 of the chuck unit 12 (see FIG. 7). On the other hand, at the second rotation position, the first output air flow path 74 of the flow path block portion 70 of the valve unit main body 62 is connected to the second connection passage 40 of the connector body 36 of the chuck unit 12. Further, the second output air flow path 76 of the flow path block portion 70 of the valve unit main body 62 is connected to the first connection passage 38 of the connector body 36 of the chuck unit 12 (see FIG. 8).

(Operation when Connected at First Rotation Position)

The operation of the air chuck 10 when the chuck unit 12 is connected to the valve unit 56 at the first rotation position will be described with reference to FIG. 7. The fluid circuit diagram of FIG. 7 shows a state in which the first solenoid valve 58 and the second solenoid valve 60 are not energized. In FIG. 7, reference symbol P1 indicates a connection point between the first output air flow path 74 and the first connection passage 38, and reference symbol P2 indicates a connection point between the second output air flow path 76 and the second connection passage 40.

When the pair of fingers 50 are urged to separate from each other, the first solenoid valve 58 and the second solenoid valve 60 are energized. When the first solenoid valve 58 is energized, air from the supply port 66 passes through the supply air flow path 78 of the flow path block portion 70 and reaches the second port 58b of the first solenoid valve 58. Thereafter, the air passes through the first output air flow path 74 of the flow path block portion 70 from the first port 58a of the first solenoid valve 58, further passes through the first connection passage 38 of the connector body 36 and the first pressure chamber air flow path 30 of the cylinder body 14, and is supplied to the first pressure chamber 26.

Further, when the second solenoid valve 60 is energized, air in the second pressure chamber 28 passes through the second pressure chamber air flow path 32 of the cylinder body 14, the second connection passage 40 of the connector body 36, and the second output air flow path 76 of the flow path block portion 70, and reaches the first port 60a of the second solenoid valve 60. Thereafter, the air passes through the second discharge air flow path 82 from the third port 60c of the second solenoid valve 60, and is exhausted from the second exhaust port 86. In this manner, since air is supplied to the first pressure chamber 26 and the air in the second pressure chamber 28 is exhausted, the pair of fingers 50 are driven to separate from each other. Since the second exhaust port 86 is provided with the variable throttle valve, the speed at which the pair of fingers 50 move away from each other can be adjusted.

When the pair of fingers 50 are urged to approach each other, energization of the first solenoid valve 58 and the second solenoid valve 60 is stopped. By stopping the energization of the second solenoid valve 60, the air from the supply port 66 passes through the supply air flow path 78 of the flow path block portion 70 and reaches the second port 60b of the second solenoid valve 60. Thereafter, the air passes through the second output air flow path 76 of the flow path block portion 70 from the first port 60a of the second solenoid valve 60. Further, the air passes through the second connection passage 40 of the connector body 36 and the second pressure chamber air flow path 32 of the cylinder body 14, and is supplied to the second pressure chamber 28.

Further, by stopping the energization of the first solenoid valve 58, the air in the first pressure chamber 26 passes through the first pressure chamber air flow path 30 of the cylinder body 14, the first connection passage 38 of the connector body 36, and the first output air flow path 74 of the flow path block portion 70, and reaches the first port 58a of the first solenoid valve 58. Thereafter, the air passes through the first discharge air flow path 80 from the third port 58c of the first solenoid valve 58, and is exhausted from the first exhaust port 84. In this manner, since air is supplied to the second pressure chamber 28 and the air in the first pressure chamber 26 is exhausted, the pair of fingers 50 are driven to approach each other. Since the first exhaust port 84 is provided with the variable throttle valve, the speed at which the pair of fingers 50 move toward each other can be adjusted.

The air chuck 10 is attached to the robot arm or the like (not shown) with the fingers 50 downward. When a workpiece is gripped in manner that the workpiece is sandwiched inside the pair of fingers 50, as described above, the chuck unit 12 may be connected to the valve unit 56 at the first rotation position. Since the pair of fingers 50 are driven to approach each other at the time of de-energization due to power failure or the like, it is possible to prevent the workpiece from falling.

(Operation when Connected at Second Rotation Position)

Figure 8:
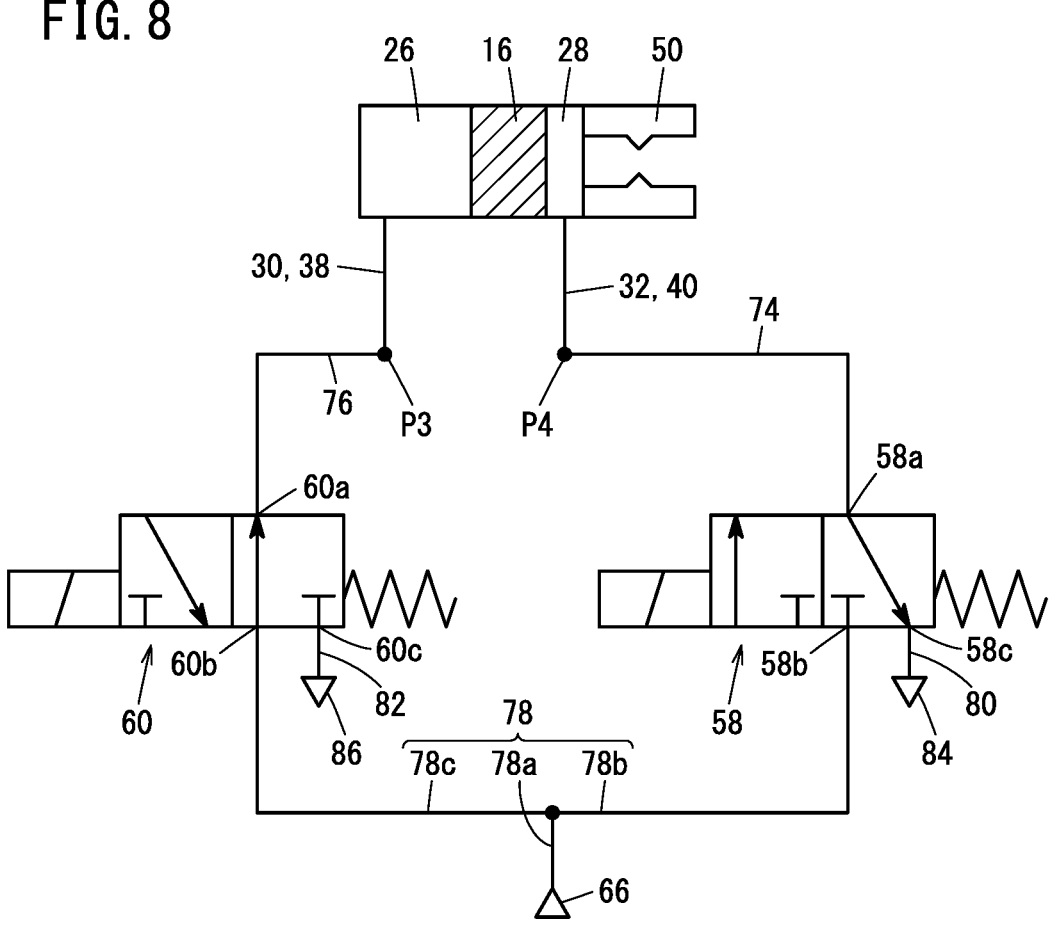
FIG. 8 is a fluid circuit diagram of the air chuck of FIG. 1 when the chuck unit is connected to the valve unit at a second rotation position.

Next, the operation of the air chuck 10 when the chuck unit 12 is connected to the valve unit 56 at the second rotation position will be described with reference to FIG. 8. The fluid circuit diagram of FIG. 8 shows a state in which the first solenoid valve 58 and the second solenoid valve 60 are not energized. In FIG. 8, reference symbol P3 indicates a connection point between the second output air flow path 76 and the first connection passage 38, and reference symbol P4 indicates a connection point between the first output air flow path 74 and the second connection passage 40.

When the pair of fingers 50 are urged to separate from each other, energization of the first solenoid valve 58 and the second solenoid valve 60 is stopped. By stopping the energization of the second solenoid valve 60, the air from the supply port 66 passes through the supply air flow path 78 of the flow path block portion 70 and reaches the second port 60b of the second solenoid valve 60. Thereafter, the air passes through the second output air flow path 76 of the flow path block portion 70 from the first port 60a of the second solenoid valve 60. Further, the air passes through the first connection passage 38 of the connector body 36 and the first pressure chamber air flow path 30 of the cylinder body 14, and is supplied to the first pressure chamber 26.

Further, by stopping the energization of the first solenoid valve 58, the air in the second pressure chamber 28 passes through the second pressure chamber air flow path 32 of the cylinder body 14, the second connection passage 40 of the connector body 36, and the first output air flow path 74 of the flow path block portion 70, and reaches the first port 58a of the first solenoid valve 58. Thereafter, the air passes through the first discharge air flow path 80 from the third port 58c of the first solenoid valve 58, and is exhausted from the first exhaust port 84. In this manner, since air is supplied to the first pressure chamber 26 and the air in the second pressure chamber 28 is exhausted, the pair of fingers 50 are driven to separate from each other. Since the first exhaust port 84 is provided with the variable throttle valve, the speed at which the pair of fingers 50 move away from each other can be adjusted.

When the pair of fingers 50 are urged to approach each other, the first solenoid valve 58 and the second solenoid valve 60 are energized. By energizing the first solenoid valve 58, air from the supply port 66 passes through the supply air flow path 78 of the flow path block portion 70 and reaches the second port 58*b* of the first solenoid valve 58. Thereafter, the air passes through the first output air flow path 74 of the flow path block portion 70 from the first port 58*a* of the first solenoid valve 58. Further, the air passes through the second connection passage 40 of the connector body 36 and the second pressure chamber air flow path 32 of the cylinder body 14, and is supplied to the second pressure chamber 28.

Further by energizing the second solenoid valve 60, air in the first pressure chamber 26 passes through the first pressure chamber air flow path 30 of the cylinder body 14, the first connection passage 38 of the connector body 36, and the second output air flow path 76 of the flow path block portion 70, and reaches the first port 60*a* of the second solenoid valve 60. Thereafter, the air passes through the second discharge air flow path 82 from the third port 60*c* of the second solenoid valve 60, and is exhausted from the second exhaust port 86. In this manner, since air is supplied to the second pressure chamber 28 and the air in the first pressure chamber 26 is exhausted, the pair of fingers 50 are driven to approach each other. Since the second exhaust port 86 is provided with the variable throttle valve, the speed at which the pair of fingers 50 move toward each other can be adjusted.

The air chuck 10 is attached to the robot arm or the like (not shown) with the fingers 50 downward. When the pair of fingers 50 are moved away from each other to grip the workpiece on the outside thereof, as described above, the chuck unit 12 may be connected to the valve unit 56 at the second rotation position. Since the pair of fingers 50 are driven to separate from each other at the time of de-energization due to power failure or the like, it is possible to prevent the workpiece from falling.

According to the air chuck 10 of the present embodiment, the first solenoid valve 58 and the second solenoid valve 60 are a combination of a normally closed solenoid valve and a normally open solenoid valve. Therefore, the workpiece can be prevented from falling when the first solenoid valve 58 and the second solenoid valve 60 are de-energized due to a power failure or the like. Further, the chuck unit 12 can be selectively connected to the valve unit 56 at the first rotation position or the second rotation position, the rotation angle of the chuck unit 12 around the central axis CL of the valve unit 56 at the first rotation position being different from that at the second rotation position. For this reason, since the connection relationship between the first solenoid valve 58 and the second solenoid valve 60, and the first pressure chamber 26 and the second pressure chamber 28, can be switched, it is possible to easily realize the prevention of falling of the workpiece according to the gripping form of the workpiece.

In the present embodiment, the air chuck 10 is configured to include a pair of fingers 50 (two fingers 50). However, for example, three or more fingers may be provided as in a case where a plurality of fingers are arranged at equal angles on a single circumference when viewed from a predetermined direction.

The present invention is not limited to the embodiment described above, and various configurations may be adopted therein without deviating from the essence and gist of the present invention.

What is claimed is:

1. An air chuck comprising:
   a chuck unit including a plurality of fingers; and
   a valve unit attached to a robot arm or a transport device, wherein
   the chuck unit includes a first pressure chamber and a second pressure chamber disposed on both sides of a piston configured to drive the plurality of fingers,
   the valve unit includes a first output air flow path connected to one of the first pressure chamber or the second pressure chamber, a second output air flow path connected to another one of the first pressure chamber or the second pressure chamber, a first solenoid valve connected to the first output air flow path, and a second solenoid valve connected to the second output air flow path,
   the first solenoid valve connects the first output air flow path to an air supply source when energized and opens the first output air flow path to atmosphere when de-energized, and
   the second solenoid valve opens the second output air flow path to the atmosphere when energized and connects the second output air flow path to the air supply source when de-energized, wherein
   the chuck unit is configured to be selectively connected to the valve unit at a first rotation position or a second rotation position, a rotation angle of the chuck unit around a central axis of the valve unit at the first rotation position being different from the rotation angle of the chuck unit around the central axis of the valve unit at the second rotation position,
   the first output air flow path is connected to the first pressure chamber and the second output air flow path is connected to the second pressure chamber at the first rotation position, and
   the first output air flow path is connected to the second pressure chamber and the second output air flow path is connected to the first pressure chamber at the second rotation position.

2. The air chuck according to claim 1, wherein
   the valve unit includes a single supply port, a first exhaust port provided with a variable throttle valve, and a second exhaust port provided with a variable throttle valve,
   the supply port is connected to the first solenoid valve and the second solenoid valve via a predetermined flow path,
   the first exhaust port is connected to the first solenoid valve via a predetermined flow path, and
   the second exhaust port is connected to the second solenoid valve via a predetermined flow path.

3. The air chuck according to claim 1, wherein
   the valve unit includes a valve unit main body including an outer wall portion having a cylindrical shape, and
   the chuck unit includes a connector body having a disk shape and connected to the valve unit main body.

4. The air chuck according to claim 3, wherein
   the first solenoid valve and the second solenoid valve are attached to the valve unit main body, and
   the outer wall portion of the valve unit main body includes an opening configured to allow attachment and detachment of the first solenoid valve and the second solenoid valve.

5. The air chuck according to claim 4, wherein
   a waterproof cover having a cylindrical shape and configured to cover the opening is attached to the valve unit main body.

6. The air chuck according to claim 3, wherein the chuck unit includes a magnetic sensor configured to detect a position of the piston, and the outer wall portion of the valve unit main body is provided with an electrical connector to which a lead wire of the magnetic sensor, a lead wire of the first solenoid valve, and a lead wire of the second solenoid valve are connected.

\* \* \* \* \*